(12) United States Patent
Vohwinkel et al.

(10) Patent No.: US 6,468,659 B1
(45) Date of Patent: Oct. 22, 2002

(54) RESIN SYSTEM

(75) Inventors: Friedrich Vohwinkel, Westerkappeln (DE); Stefan Foerster, Opfikon (CH); Jens Rocks, Ennetbaden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 09/720,158

(22) PCT Filed: Jun. 25, 1999

(86) PCT No.: PCT/CH99/00275
§ 371 (c)(1),
(2), (4) Date: Feb. 9, 2001

(87) PCT Pub. No.: WO99/67315
PCT Pub. Date: Dec. 29, 1999

(30) Foreign Application Priority Data

Jun. 25, 1998 (DE) .......................................... 198 28 248

(51) Int. Cl.[7] .............................................. B32B 27/38
(52) U.S. Cl. ........................... 428/413; 29/855; 29/887; 174/137 R; 174/120 SR; 174/251; 523/455; 523/456; 523/457; 523/466; 525/526; 525/530; 525/533; 528/88; 528/112; 528/408; 528/418
(58) Field of Search .................... 523/455, 456, 523/457, 466; 525/526, 530, 533; 528/88, 112, 408, 418; 29/855, 887; 174/251, 120 SR, 137 R; 428/413

(56) References Cited

U.S. PATENT DOCUMENTS

| | | | |
|---|---|---|---|
| 2,884,406 A | 4/1959 | Wegler et al. | ................. 260/47 |
| 3,222,321 A | 12/1965 | Sekmakas | ..................... 260/72 |

(List continued on next page.)

FOREIGN PATENT DOCUMENTS

| | | |
|---|---|---|
| BE | 617540 | 8/1962 |
| DE | 1019083 | 11/1957 |
| DE | 2650746 | 11/1976 |
| DE | 4040471 | 2/1992 |
| EP | 0456603 | 4/1991 |
| WO | WO85/05215 | 11/1985 |

OTHER PUBLICATIONS

Lee & Neville, "Handbook of Epoxy Resin", McGraw–Hill, p. 12–3, 1967.*
James A. Graham et al., "Epoxy with Low–Temperature Cure and High–Temperature Properties Developed", *Adhesive Age*, published by Chemical Week Associates, New York, NY, Jul. 1978, pp. 20–23.

(List continued on next page.)

*Primary Examiner*—Robert Dawson
*Assistant Examiner*—D. Aylward
(74) *Attorney, Agent, or Firm*—Burns, Doane, Swecker & Mathis, L.L.P.

(57) ABSTRACT

The resin system comprises at least two components which can be stored separately and crosslinked with one another at room temperature, preferably without curing accelerators. The first component comprises at least one compound of the formula (I)

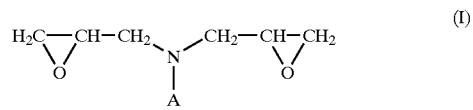

where A is an unsubstituted or substituted aromatic radical.

The second component comprises at least one cyclic anhydride of an organic acid. However, the compound of the formula (I) here is not a compound of the formula (II)

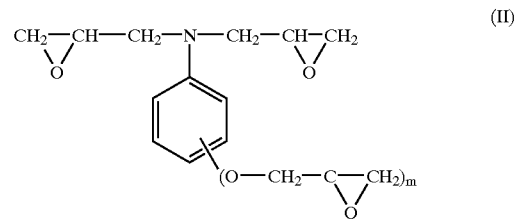

where m=1 or 2,
if the cyclic anhydride is a compound of the formula (III)

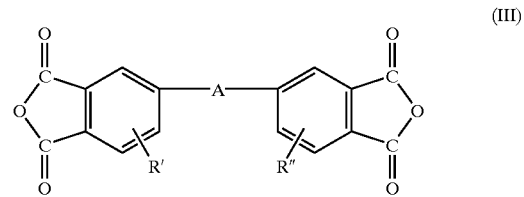

where A is a carbonyl radical, or has the formula

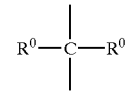

where each radical R° is a hydrogen atom or halogen atom, a hydroxyl radical or a $C_1$-$C_5$-alkyl radical or an alkoxy radical, or a $C_1$-$C_5$-alkyl-substituted oxycarbonyl radical, and R' and R", independently of one another, are hydrogen atoms or halogen atoms, $C_1$-$C_5$-alkyl groups, nitro groups, carboxyl groups, sulfonyl groups or amino groups.

34 Claims, No Drawings

U.S. PATENT DOCUMENTS

| | | | |
|---|---|---|---|
| 3,294,743 A | 12/1966 | Mack | 260/47 |
| 3,683,044 A | 8/1972 | Huang et al. | 260/830 |
| 4,002,599 A | 1/1977 | Graham | 260/47 |
| 4,532,308 A | 7/1985 | Sato et al. | 525/482 |
| 4,559,272 A | 12/1985 | Oldham | 428/418 |
| 4,595,623 A | 6/1986 | Du Pont et al. | 428/195 |
| 4,916,202 A * | 4/1990 | Butler | 528/98 |
| 5,111,897 A | 5/1992 | Snyder et al. | 177/132 |
| 5,280,069 A | 1/1994 | Dobinson et al. | 525/109 |
| 5,362,849 A | 11/1994 | Dobinson et al. | 528/418 |
| 5,629,379 A | 5/1997 | Harper | 525/65 |

OTHER PUBLICATIONS

K. H. Büchel, "Houben–Weyl Methoden der organischen Chemie [Methods of Organic Chemistry]", vol. E20, "Makromolekulare Stoffe [Macromolecular Materials]", Herbert Bartle, Ed., published by George Thieme Verlag, Stuttgart, Germany, 1987, p. 1959.

P. Guerrero, "Influence of Cure Schedule and Stoichiometry on the Dynamic Mechanical Behaviour of Tetrafunctional Epoxy Resins Cured with Anhydrides" *Polymer* vol. 37, No. 11, pp. 2195–2200, 1996.

Copy of Search Report from German Patent Office dated Jan. 12, 1999, with English translation of explanations.

Chemical Abstract No. 86:90971 corresponding to JP 05 111897, Jan. 30, 1976.

Copy of PCT Search Report dated Oct. 20, 1999.

Chemical Abstracts, vol. 115, 1991, 115:209377, corresponding to JP 03050242 A2, Mar. 4, 1991.

Derwent Abstract No. 1980–87160C/198049, corresponding to JP55135155 dated Oct. 21, 1980.

Derwent Abstract No. 1985–089650/198515, corresponding to JP60038421 dated Feb. 28, 1985.

* cited by examiner

RESIN SYSTEM

This application is related and claims priority under 35 U.S.C. §119 and/or 305 to international application PCT/CH99/00275, filed on Jun. 25, 1999, the entire contents of which are incorporated by reference herein.

FIELD OF THE INVENTION

The present invention relates to a resin systems, and more specifically to epoxy resin-hardener systems, and products made thereof.

BACKGROUND OF THE INVENTION

Epoxy resins are among the most versatile polymeric materials. Examples of their applications are coatings, adhesives, casting compositions, molding compositions, potting compositions for encapsulating electronic components, laminates and base material for printed circuits, and also matrix resins for fiber-reinforced plastics.

The conversion of monomeric or oligomeric epoxy resins into polymers requires reaction partners which are termed hardeners. Depending on the type of hardener, the curing reaction takes place at temperatures around room temperature, or at low temperatures (known as cold curing) or at elevated temperatures (known as hot curing).

For curing epoxy resins at low temperatures for industrial applications it is predominantly only aliphatic primary or secondary amines and polyaminoamides which are used, and less frequently polythiols or specific ionic catalysts. All unmodified amines have an alkaline to strongly alkaline reaction. liquid amines, in particular the aliphatic and cycloaliphatic amines, can cause skin damage extending to corrosive burns. Another disadvantage is the high volatility of liquid amines. A great disadvantage of cold curing of epoxy resins using the abovementioned hardeners is the low heat resistance and chemicals resistance of the resultant products.

To increase heat resistance, solvent resistance and chemicals resistance it is necessary to complete the curing of epoxy resins at elevated temperatures, by hot-curing using aromatic or cycloaliphatic amines, carboxylic anhydrides, polyphenols, novolaks or using latent hardeners.

It is known from Houben-Weyl, Methoden der Organischen Chemie [Methods in Organic Chemistry], Vol. E20, Makromolekulare Stoffe [Macromolecular materials], Georg Thieme Verlag Stuttgart, 1987, p. 1959 that, in particular in the case of bisphenol A resins, the curing of epoxy resins with cyclic dicarboxylic anhydrides or with tetracarboxylic bisanhydrides gives cured products with excellent electrical insulation properties and with good heat resistance. A further advantage is that curing with anhydrides, unlike curing with amines, is not significantly exothermic. However, a disadvantage is that curing temperatures of at least 120–150° C. are always required, and even then some hours are needed for curing. Even at these temperatures, the crosslinking reaction is still so slow that it is generally essential to use accelerators. However, experience has shown that the use of curing accelerators can lead to loss of quality in the cured resin systems.

U.S. Pat. No. 5,629,379 describes a cured epoxy resin system made from a mixture of four components which gels at a temperature between 80 and 120° C. and is cured at temperatures between 200 and 300° C. Besides the epoxy resin component and the anhydride hardener component, the mixture comprises in particular an additional hardener component, and also a curing accelerator component.

U.S. Pat. No. 4,559,272 describes a process for potting an electrical component by impregnating the electrical component with a hot-curing composition made from a polyglycidic aromatic amine, a polycarboxylated carboxylic anhydride and a curing accelerator, and then curing the composition. As disclosed in that publication, the curing accelerator is in particular added in order to achieve a low curing temperature. The gel point disclosed in the examples is about 100° C. In U.S. Pat. No. 4,595,623, the same applicant describes a fiber-reinforced, syntactic foam composite material which as matrix likewise has the abovementioned hot-curing composition.

DE 26 50 746 and U.S. Pat. No. 4,002,599 describe a room-temperature-curing epoxy resin composition which comprises a mixture of a polyglycidylarninophenol epoxy resin and a biphenyl anhydride. All of the examples described here are in particular based on the curing of triglycidyl-p-aminophenol (TGpAP) with benzophenone-3, 3',4,4'-tetracarboxylic dianhydride (BTDA) as sole hardener, or with hardener mixtures made from BTDA and maleic anhydride (MA).

However, the TGpAP-BTDA system described in DE 26 50 746 and U.S. Pat. No. 4,002,599 proves, in particular in industrial or practical use, to be disadvantageous and highly problematic, since the BTDA is extremely difficult to dissolve in TGpAP. The inventors therefore recommend an extreme degree of mixing, e.g. three hours in a ball mill. Another recommendation is that the BTDA should be very finely pulverized or treated with high shear forces on a three-roll mill. However, these lengthy procedures can in particular bring about hydrolysis of the anhydride, and in addition the dissolution of BTDA in TGpAP generally remains incomplete. Further to this, additional production steps lead to prolonged production times and thus to increased production costs.

The publication by J. E. O'Connor and J. A. Graham, the inventor in DE 26 50 746 and U.S. Pat. No. 4,002,599, in Adhesives Ages 21/7 (July 1978), pp. 20–23 entitled "Epoxy with Low-Temperature Cure and High-Temperature Properties Developed" includes a further description and commentary of the invention disclosed in DE 26 50 746 and U.S. Pat. No. 4,002,599. As can be found in lines 20 et seq. of the 3rd column on p. 20, the authors themselves in their invention expressly describe the TGpAP-BTDA system as an exception, as follows: "The TGpAP-BTDA system appears to be the 'exception to the rule' regarding BTDA as a hardener for epoxy resins".

There is therefore a demand for epoxy resin-hardener systems which can cure at a low temperature and give products which have increased heat resistance, chemicals resistance and solvent resistance. Examples of potential applications would be adhesives, matrix resins for fiber composite materials and repair resins for components, in cases where the use of high temperatures is not permissible. Other applications would be casting compounds and potting compounds, specifically for encapsulating large electronic components, in cases where the curing can be completed at low temperature, with little exothermic effect, and therefore with a considerable energy saving, another advantage here being that the products produced have less internal stress.

SUMMARY OF THE INVENTION

It is an object of the present invention, therefore, to provide a resin system which can be crosslinked at low temperature, in particular at room temperature, and preferably without using a curing accelerator.

Another object of the present invention is to provide a resin system whose solubility behavior in particular, and particularly that of the hardener component, is better than that of known systems.

A further object of the present invention is to provide a process for producing an insulated electrical conductor, the insulation of which can take place at low temperatures, in particular room temperature.

The term "crosslinkability" here is to be taken as meaning the capability of a polymerizable system to assume an irreversible state.

Surprisingly, it has now been found that the system described by Graham and O'Connor is not an exception but merely one example of the generally applicable principle of the curing of epoxy resins by cyclic anhydrides at low temperatures. However, a precondition is that the individual polyfunctional epoxy resins, or the various polyfunctional epoxy resins which can be used in mixtures, comprise an epoxy resin having at least one aminoglycidyl group. According to the invention, a wide variety of aromatic, aliphatic, cycloaliphatic or heterocyclic acid anhydrides is suitable for the cold curing of epoxy resins, preferably giving products with increased heat resistance. The authors Graham and O'Connor did not recognize the generally applicable principle within their invention.

Surprisingly, it has now been found that there are numerous combinations of cyclic anhydrides and aminoglycidyl compounds which have markedly better solubility behavior than the system described by Graham and O'Connor and which give homogeneous and transparent moldings, cf. Table 3.

DETAILED DESCRIPTION OF THE INVENTION

The epoxy resins which can be used in the present invention have on average more than one epoxy group per molecule, and at least one of these groups must be present in the form of an aminoglycidyl compound. Particularly suitable aminoglycidyl compounds of this invention are N,N-diglycidylaniline, N,N-diglycidyltoluidine, N,N,N',N'-tetraglycidyl-1,3-diaminobenzene, N,N,N',N'-tetraglycidyl-1,4-diaminobenzene, N,N,N',N'-tetraglycidylxylylenediamine, N,N,N',N'-tetraglycidyl4,4'-diaminodiphenylmethane, N,N,N',N'-tetraglycidyl-3,3'-diethyl4,4'-diaminodiphenylmethane, N,N,N',N'-tetraglycidyl-3,3'-diaminodiphenyl sulfone, N,N'-dimethyl-N,N'-diglycidyl-4,4'-diaminodiphenylmethane, N,N,N',N'-tetraglycidyl-α,α'-bis(4-aminophenyl)-p-diisopropylbenzene and N,N,N',N'-tetraglycidyl-α,α'-bis(3,5-dimethyl-4-aminophenyl)-p-diisopropylbenzene. Other particularly preferred aminoglycidyl compounds of the formula (I) are given in Table 6 with tradename, manufacturer and structural chemical formula.

TABLE 6

Particularly preferred embodiments of the compounds of formula (I)

| Tradename/manufacturer | Structure |
| --- | --- |
| MY720/Ciba<br>MY721/Ciba<br>MY722/Ciba<br>MY9512/Ciba | (structure) |
| Epon HPT 1071/Shell | (structure) |
| Epon HPT 1072/Shell | (structure) |

Particularly suitable polyglycidyl compounds of aminophenols are O,N,N-triglycidyl-4-aminophenol, O,N,N-triglycidyl-3-aminophenol and 2,2-(N,N-diglycidyl-4-aminophenyl-1,4'-glycidyloxyphenyl)propane. Other aminoglycidyl compounds which may be used according to the invention are described in Houben-Weyl, Methoden der Organischen Chemie, Vol. E20, Makromolekulare Stoffe, Georg Thieme Verlag Stuttgart, 1987, pp. 1926–1928. The tri- and tetrafunctional aminoglycidyl compounds may be prepared by the processes described in U.S. Pat. No. 2,884,406, U.S. Pat. No. 2,921,037 and U.S. Pat. No. 2,951,822, for example, or else by those described in EP 148 117.

Other polyepoxides may be used concomitantly with the aminoglycidyl compounds, and their proportion in the epoxy resin mixture may be from 1 to not more than 75 mol %, preferably from 10 to 50 mol %. These other polyepoxides may be aliphatic, cycloaliphatic, aromatic or heterocyclic, and may also have substituents, such as halogens, hydroxyl, ethers radicals or other radicals. They are generally based on the polyhydric phenols which are known and described in detail in the literature, i.e. bisphenol A, bisphenol F and bisphenol S, on epoxidized phenol novolaks or on epoxidized cresol novolaks, or on cycloaliphatic epoxy resins. Examples of aliphatic epoxy resins are epoxyalkanes, diglycidyl ethers of diols, and also cis/trans-1,4-cyclohexanedimethanol diglycidyl ethers. Examples of cycloaliphatic epoxy resins are cyclohexene oxide, 4-vinyl-1-cyclohexene diepoxide and 3,4-epoxycyclohexylmethyl 3,4epoxycyclohexanecarboxylate.

Suitable hardeners are cyclic anhydrides of aromatic, aliphatic, cycloaliphatic or heterocyclic polycarboxylic acids. Particularly suitable anhydrides of aromatic polycarboxylic acids can be described by the formulae I to III, where $R_1$, $R_2$, $R_3$ and $R_4$ may be hydrogen or substituents such as halo groups, alkyl groups, alkoxy groups or nitro groups, etc. Z may be —O—, —S—, —$SO_2$—, —CO—, —$CH_2$—, or another alkylene radical, or else an oxoalkylene radical, where n=0 or 1.

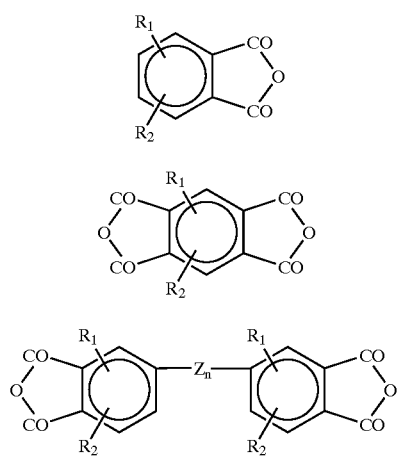

Examples of anhydrides having the structures I to III are: phthalic anhydride, 4-methyl-phthalic anhydride, 3,6- and 4,5-dichlorophthalic anhydride, 3,6-difluorophthalic anhydride, tetrabromo-, tetrachloro- and tetrafluorophthalic anhydride, 3- and 4-nitro-phthalic anhydride, benzene-1,2, 4,5-tetracarboxylic dianhydride (pyromellitic dianhydride), 3,3',4,4'-benzophenonetetracarboxylic dianhydride, 2,2-bis (3,4-dicarboxy-phenyl)propane dianhydride, 2,2-bis(2,3-dicarboxyphenyl)propane dianhydride, 2,2-bis-(3,4-benzenedicarboxylic anhydride)perfluoropropane, bis(3,4-dicarboxyphenyl) ether dianhydride, bis(3,4-dicarboxyphenyl)methane dianhydride, 2,2', 3,3'-biphenyltetracarboxylic dianhydride and 3,3',4,4'-biphenyltetracarboxylic dianhydride. The aromatic carboxylic anhydrides may contain additional functional groups. Examples of such compounds are: benzene-1,2,4-tricarboxylic anhydride (trimellitic anhydride), 3-hydroxyphthalic anhydride, 3- and 4-maleimidophthalic anhydride, and also the cyclic anhydride of 2-sulfobenzoic acid. Other suitable compounds are derivatives of trimellitic anhydride, e.g. the bis(trimellitic anhydride) of neopentyl glycol.

Besides the anhydrides described under I to III, aromatic carboxylic anhydrides having condensed ring systems are also suitable: 1,8-naphthalic anhydride, naphthalene-1,4,5,8-tetracarboxylic dianhydride, naphthalene-1,2,5,6-tetracarboxylic dianhydride, naphthalene-3,4,5,8-tetracarboxylic dianhydride, naphthalene-2,3,6,7-tetracarboxylic dianhydride, 3,4,9,10-perylenetetracarboxylic dianhydride, and their halo and nitro derivatives.

The aliphatic dicarboxylic anhydride particularly suitable and preferred in this invention is maleic anhydride. It can be used as sole hardener for aminoglycidyl resins and for their mixtures with other epoxy resins. Maleic anhydride has very good solubility in the aminoglycidyl resins. In mixtures with other anhydrides, maleic anhydride acts as solubilizer and increases the rate of dissolution. The cured resins have excellent heat resistance and high glass transition temperatures. Other suitable anhydrides are derivatives of maleic anhydride, e.g. methyl- and dimethylmaleic anhydride, phenyl- and diphenylmaleic anhydride, bromomaleic anhydride, dicholoromaleic anhydride and the like.

Some cycloaliphatic dicarboxylic anhydrides which can be used according to the invention have the advantage of being liquid or low-melting, for example cis-cyclohexane-1,2-dicarboxylic anhydride, 4-methylcyclohexane-1,2-dicarboxylic anhydride, methylcyclo-hexene-4,5-dicarboxylic anhydrides and bicyclic compounds, such as methyl-5-norbornene-2,3-dicarboxylic anhydride and its isomeric mixtures (commercially available as NADIC methyl anhydride). Other suitable mono- or bicyclic cycloaliphatic dicarboxylic anhydrides are 1,2,3,4-cyclobutanetetracarboxylic dianhydride, cis-1,2,3,4-cyclopentanetetracarboxylic dianhydride, trans-cyclohexane-1,2-dicarboxylic anhydride, 1-cyclopentene-1, 2-dicarboxylic anhydride, cis-4-cyclohexene-1,2-dicarboxylic anhydride, cis-5-norbornene-endo-2,3-dicarboxylic anhydride (NADIC anhydride), bicyclo[2.2.2] oct-7-ene-2,3,5,6-tetracarboxylic dianhydride and 1,4,5,6,7, 7-hexachloro-5-norbornene-2,3-dicarboxylic anhydride (HET anhydride).

Examples of heterocyclic carboxylic anhydrides which may be used according to the invention are pyridine-2,3-dicarboxylic anhydride, pyridine-3,4-dicarboxylic anhydride, pyrazine-2,3-dicarboxylic anhydride, pyrazine-2,3,5,6-tetracarboxylic dianhydride, thiophene-2,3,4,5-tetracarboxylic dianhydride, tetrahydrofuran-2,3,4,5-tetracarboxylic dianhydride, isatoic anhydride and N-methylisatoic anhydride.

Other cyclic anhydrides particularly preferred for the present invention are given in Table 7, with the abbreviations used here and the structural chemical formula.

TABLE 7

Cyclic anhydride embodiments particularly preferred for the present invention.

| Abbreviation | Structure |
| --- | --- |
| BTDA | |
| PYRO | |

TABLE 7-continued

Cyclic anhydride embodiments particularly preferred for the present invention.

| Abbreviation | Structure |
|---|---|
| 6FDA | [structure: two phthalic anhydride groups connected by C(CF$_3$)$_2$] |
| NTCDA | [structure: naphthalene tetracarboxylic dianhydride] |
| s-BPDA | [structure: biphenyl tetracarboxylic dianhydride] |
| OPDA | [structure: two phthalic anhydrides connected via ether O linkage] |
| DSDA | [structure: two phthalic anhydrides connected via SO$_2$ linkage] |

Together with the mixtures made from aminoglycidyl compounds with cyclic carboxylic anhydrides, comcomitant use may be made of lactones. The lactones are liquid or readily fusible, have low viscosities, and improve the solubility of the acid anhydrides in the mixtures, and act as reactive diluents. Mixtures made from epoxy resins with lactones have been described in the literature. However, they have hitherto been curable at low temperatures only by amines, cf. BE 617.540, while the curing of the epoxide-lactone mixtures by acid anhydrides again requires the usual curing temperatures of from 120 to 180° C., cf. U.S. Pat. No. 3.222.321.

Examples of lactones which according to the invention can be used concomitantly in the low-temperature curing of aminoglycidyl compounds with cyclic anhydrides are β-propiolactone, β-butyrolactone, γ-butyrolactone, γ-valerolactone and ε-caprolactone and also derivatives of these, e.g. 2-acetyl-γ-butyrolacetone. The proportion of the lactones in the epoxy resin mixture may be from 0.1 to 1.5 mol per epoxy group equivalent.

The definition and calculation of the equivalents used in this text, whether epoxy equivalent of the first component or anhydride equivalent of the second component or the like, are known to the skilled worker and require no further explanation.

The cyclic carboxylic anhydride used as hardener is used at concentrations of from 0.2 to 1.2 equivalents of anhydride groups per epoxy equivalent. It is advantageous for the anhydride particles to be as fine as possible and to be introduced into the liquid epoxy resin mixture using mixing assemblies with vigorous action. If the anhydrides or the mixtures of these are liquid or readily fusible, they form the initial charge to which the epoxy resins are then added. Short mixing times using mixing or dispersion units running at high rotation rates are preferred to assemblies which run more slowly, e.g. roll mills or ball mills. It is also possible to use ultrasound or microwaves to obtain rapid and thorough mixing.

The curable mixtures of the invention may also comprise plasticizers or elasticizers, or additives, such as extenders, fillers, reinforcing fibers or flame retardants.

According to the invention, the curing may preferably take place at low temperatures, e.g. from 0 to 90° C. It is in principle possible to cure the mixtures of the invention at room temperature, achieving a degree of completion of curing of more than 90%, followed by thermal analysis methods (DSC), within a period of from some days to a few weeks. Higher temperatures, from 30 to not more than 90° C., are recommended if the epoxy resin mixtures remain solid or are highly viscous at room temperature, or if the dissolution of solid anhydrides in the epoxy resin mixture is to be accelerated. If desired, the curing may also be undertaken in two stages, by beginning to cure the curable mixture at low temperature and postcuring (annealing) the same at an elevated temperature. This method is preferred if the relatively long times for completion of curing at room temperature are to be shortened. One way is to allow the curable mixtures of the invention to cure for from 20 to 24 hours at room temperature, followed by postcuring for from 1 to 2 hours at temperatures of from 50 to 90° C. The resultant degree of completion of curing (DSC) is 97% or above.

Examples of uses of the curable compositions of the invention are laminating resins, saturating resins and casting resins, coatings, potting compounds and insulating compositions for electrical engineering, but particularly adhesives which give increased heat resistance. the increased heat resistance of the curable compositions of the invention is demonstrated using thermal analysis in the form of thermogravimetric analysis (TGA) and dynamic-mechanical analysis (DMA).

In all of the examples of applications, the concentration of the cyclic carboxylic anhydrides used as hardeners, individually or in mixtures, is always 0.64 in total anhydride group equivalents per epoxy equivalent, unless otherwise stated. If maleic anhydride is used in a mixture with other anhydrides, the ratio by weight of maleic anhydride to the second anhydride is always 3:2.

All of the resin-hardener mixtures are dispersed at 13500 rpm for 4 minutes using an Ultraturrax disperser and then cast to give test specimens for DMA. A second mix serves for production of cast articles of 2 cm thickness for visual assessment of homogeneity. To improve the thoroughness of mixing, highly viscous mixtures are subjected to prior heating for a few minutes to 30–50° C. The conditions for completion of curing are 24 h aging at room temperature followed by one hour of postcuring at 90° C. The viscosities of the mixtures are determined using a cone-and-plate viscometer at 25° C. The DMA specimens are tested using a heating rate of 3° C./min at a fixed frequency of 1 Hz, using an amplitude of 0.2 mm. The damping maximum (tan δ) serves to establish the glass transition temperature ($T_g$).

Table 1 lists the results of TGA together with the onset point for thermal decomposition and the residue at 600° C. It can be seen that the onset point of decomposition for all of the epoxides whose curing had been completed using anhydrides is much higher than those for completion of curing with DETA. Table 2 has the results from the viscosity measurements and the glass transition temperatures from DMA.

Table 3 lists the results of visual testing for homogeneity on fully cured test specimens of 2 cm thickness. The evaluation scale extends from 0 for absolutely homogeneous, transparent specimens through −1 for slight haze, −2 to −3 for increasing haze, up to −4 and −5 for specimens in which, respectively, there is slight or extensive presence of a sediment of undissolved solids. The results show that many of the systems according to the invention have considerably better homogeneity, i.e. better solubility of the anhydrides in the epoxy resins, than the system described by Graham.

The results in Table 4 prove that even mixtures of bisphenol A epoxy resins with aminoglycidyl compounds can be fully cured by anhydrides at low temperatures. However, the proportion of the aminoglycidyl compound in the mixture should not be below 25 mol %.

The following abbreviations are utilized in Tables 1 to 5, and are listed here in alphabetical order; further explanations can be found in Tables 6 and 7.

TABLE 1

Heat resistance for the fully cured epoxy resin systems
Thermogravimetric analysis (TGA), heating rate 10° C./min, in air

| SYSTEM | Onset point TGA ° C. | Residue at 600° C. % |
|---|---|---|
| MA/TgpAP | 328 | 15 |
| 6F-DA/TgpAP | 325 | 40 |
| BTDA/MA/TgpAP | 324 | 42 |
| MA/Bismaleimid | 310 | 18 |
| PYRO/MA/TgpAP | 307 | 30 |
| PYRO/TGpAP A/E = 0.8 | 305 | 13 |
| PYRO/TGpAP A/E = 0.64 | 304 | 19 |
| PYRO/TGpAP A/E = 0.4 | 300 | 29 |
| HET/MNDA/TgpAP | 300 | 4 |
| HET/MNDA/MA/TgpAP | 298 | 4 |
| HET/MCHA/TgpAP | 298 | 15 |
| HET/MCHA/MA/TgpAP | 292 | 7 |
| TRIM/MA/TgpAP | 283 | 32 |
| NPA/MA/TgpAP | 268 | 25 |
| BDA/MA/TgpAP | 274 | 15 |
| PSA/MA/TgpAP | 260 | 12 |
| Epiclon/MA/TgpAP | 244 | 10 |
| 6F-DA/MA/TgpAP | 232 | 23 |
| NCDA/MA/TgpAP | 248 | 18 |
| PYRO/TGpAP A/E = 0.2 | 220 | 18 |
| DETA/TgpAP | 158 | 15 |
| DETA/Epon 828 | 127 | 10 | a) for the epoxy resins:

| | |
|---|---|
| Epon 828 | Bisphenol A epoxy resin, commercial product from Deutsche Shell Chemie |
| DGA | N,N-Diglycidylaniline, commercial product Bakelite Rütapox VE 3650 |
| TGMDA | N,N,N',N'-Tetraglycidyl-4,4'-diaminodiphenylmethane commercial product Ciba Araldit MY 721 commercial product Bakelite Rütapox VE 2895/LV |
| TGpAP | O,N,N-Triglycidyl-4-aminophenol (triglycidyl ether of p-aminophenol) commercial product Ciba Araldit MY 510 |
| Epoxycyclo | 3,4-Epoxycyclohexylmethyl 3,4-epoxycyclohexanecarboxylate | b.) for the anhydrides:

| | |
|---|---|
| 6F-DA | Hexafluoropropylidene-2,2-bis(phthalic anhydride) |
| BDA | 1,2,3,4-Butanetetracarboxylic dianhydride |
| BTDA | 3,3',4,4'-Benzophenonetetracarboxylic dianhydride |
| CPTDA | cis-1,2,3,4-Cyclopentanetetracarboxylic dianhydride |
| Epiclon | 5-(2,5-Dioxotetrahydrofuryl)-3-methylcyclohexene-1,2-dicarboxylic anhydride; commercial product Epiclon B 4400 |
| HET | 1,4,5,6,7,7-Hexachloro-5-norbornene-2,3-dicarboxylic anhydride |
| HHPA | Hexahydrophthalic anhydride (1,2-cyclohexanedicarboxylic anhydride) |
| MA | Maleic anhydride |
| MCHA | 4-Methylcyclohexanedicarboxylic anhydride |
| MNDA | Methyl-5-norbornene-2,3-dicarboxylic anhydride (methyl NADIC anhydride) |
| NDCA | Naphthalene-1,8-dicarboxylic anhydride |
| NPA | 3-Nitrophthalic anhydride |
| PSA | Phthalic anhydride |
| PYRO | Benzene-1,2,4,5-tetracarboxylic dianhydride (pyromellitic dianhydride) |
| SBA | 2-Sulfobenzoic anhydride |
| TRIM | Benzene-1,2,4-tricarboxylic anhydride (trimellitic anhydride) | c.) other compounds and hardeners

| | |
|---|---|
| Bismaleimid | Bis-(4-maleimidophenyl)methane |
| Butyro | γ - Butyrolactone |
| Capro | ε - Caprolactone |
| DETA | Diethylenetriamine | d.) A/E is the molar ratio of anhydride groups to epoxy groups

TABLE 2

Viscosities and glass transition temperatures of various epoxy resin-hardener mixtures

| SYSTEM | Initial viscosity in mPas | Viscosity in mPa s after min. or hrs. (h) | Tg (DMA) run 1/run 2 °C./°C. |
|---|---|---|---|
| BTDA/MA/TgpAP | 260 | | 182.9 183.7 |
| MA/TGpAP | 40 | 120/145 3760/12 h | 142.7 143.3 |
| CPTDA/MA/TgpAP | 110 | 840 120 | 155.9 159.3 |
| HET/MA/TGpAP | 1380 | 25 600 20 | 150.4 151.2 |
| SBA/MA/TGpAP | 520 | 11 520 35 | 212.2 209.6 |
| PYRO/MA/TGpAP | 440 | 4000 80 | 185.7 184.1 |
| PYRO/MCHA/TGpAP | 660 | 24 320 3.5 h | 181.0 181.6 |
| PYRO/HHPA/TGpAP | 1120 | 10 880 95 | 167.5 168.5 |
| PYRO/MA/TGMDA | 2480 | 30 720 55 | 224.5 223.4 |
| PYRO/DGA | 90 | 16 640 460 | 133.3 133.4 |
| TRIM/MA/TGpAP | 280 | 12 160 230 | 204.8 203.8 |
| TRIM/MA/PYRO/TGpAP | 660 | 12 800 65 | 196.9 197.0 |
| TRIM/MA/TGMDA | 7680 | 18 500 45 | 236.6 237.1 |
| TRIM/MA/MCHA/TGpAP | 920 | 17 280 145 | 212.4 213.3 |

TABLE 3

Viscosities and homogeneity of various epoxy resin-hardener mixtures

| SYSTEM | Initial viscosity in mPa s | Homogeneity values from 0 (homogeneous, transparent) to −5 (sediment) |
|---|---|---|
| BDTA/TgpAP | 8800 | −5 much sediment |
| BTDA/MA/TgpAP | 260 | −3 |
| MA/TGpAP | 40 | 0 |
| CPTDA/MA/TgpAP | 110 | −2 |
| HET/MA/TgpAP | 1380 | −1 |
| SBA/MA/TgpAP | 520 | −1 |
| PYRO/TgpAP with A/E = 0.64 | 2700 | −3 |
| PYRO/MA/TGpAP with A/E = 0.64 | 460 | 0 |
| PYRO/MA/TGpAP with A/E = 1.0 | 240 | 0 |
| PYRO/MCHA/TgpAP | 660 | −1 |
| PYRO/HHPA/TgpAP | 1120 | −2 |
| PYRO/MA/TGMDA | 2480 | 0 |
| PYRO/DGA | 90 | 0 |
| TRIM/MA/PYRO/TGpAP | 660 | −1 |
| TRIM/MA/TGMDA | 7680 | −1 |
| TRIM/MA/MCHA/TgpAP | 920 | −4 |
| TRIM/MA/TgpAP | 280 | −1 |
| PYRO/MA/TgpAP/Epon 828 with TgpAP/Epon 828 = 50/50 mol % | 530 | 0 |
| PYRO/Butyro/TGpAP with Butyro/PYRO = 50/50 mol % | 590 | 0 |
| HET/Butyro/TgpAP with Butyro/HET = 50/50 mol % | 1320 | 0 |
| HET/Capro/TgpAP with Capro/HET = 50/50 mol % | 1680 | −2 |
| HET/MNDA/TgpAP with HET/MNDA = 50/50 mol % | 2800 | 0 |
| DETA/TgpAP | 160 | −1 |
| DETA/Epon 828 | 2500 | 0 |

TABLE 4

Completion of curing of TGpAP in a mixture with a bisphenol A epoxide

| SYSTEM | Initial viscosity in mPa s | Viscosity in mPa s/ after minutes | Tg run 1 °C. | Tg run 2 °C. |
|---|---|---|---|---|
| PYRO/MA/TGpAP 100% TgpAP | 350 | 57 600 85 | 184.1 | 185.7 |
| PYRO/MA/TGpAP/ Epon 828 TGpAP/828 = 75/25 mol % | 460 | 12 080 125 | 154.5 | 156.4 |
| PYRO/MA/TGpAP/ Epon 828 TGpAP/828 = 50/50 mol % | 530 | 14 080 170 | 146.6 | 149.3 |
| PYRO/MA/TGpAP/ Epon 828 TGpAP/828 = 25/75 mol % | 550 | 9600 265 | 98.2 | 98.6 |
| PYRO/MA/EPON 828 100% EPON 828 | | no reaction | remains liquid | |

EXAMPLES OF APPLICATION

Example 1

Adhesive Bonding of Aluminum Alloys

The adhesive bonding of aluminum alloys is used to test the suitability of the curable compositions of the invention as adhesives which complete their curing at low temperatures and have increased heat resistance.

According to the invention, the epoxy resin systems used are composed of aminoglycidyl compounds and of cyclic carboxylic anhydrides. The epoxy resins are first mixed with 33% by weight of aluminum powder, which is also present in commercially available adhesive formulations, then the hardener component is added to this and all the constituents are then vigorously and thoroughly mixed. Particularly high-viscosity mixtures are heated for a few minutes to 30–50° C. to accelerate mixing. In all of the examples of applications, the concentration of the cyclic carboxylic anhydrides used as hardeners is 0.64 equivalents of anhydride group per epoxy equivalent. If maleic anhydride is used in a mixture with other anhydrides, the ratio by weight of maleic anhydride to the second anhydride is always 3:2. The mixture of O,N,N-triglycidyl-4-aminophenol (the triglycidyl ether of p-aminophenol=TGpAP) with the bisphenol A epoxy resin (Epon 828) comprises the epoxy resins in a ratio of 75:25 molar percent.

The sheets made from commercially available aluminum alloy (aviation quality) are pretreated by degreasing, alkaline pickling and conventional pickling. The vigorously mixed, curable compositions are applied as adhesive at from 100 to 200 μm layer thickness. The bonded adhesion specimens are left for 24 hours at room temperature and then postcured for an hour at 90° C. The bond strength of the bonds between the overlapping metals is determined by the tensile shear test for single-lap joints to DIN 53283 at 25, 120 and 150° C. The initial strengths and the residual bonded strength after 40 days of storing the bonded specimens into water at 70° C. are determined.

The epoxy adhesive EA 934 NA with components A and B from Hysol Dexter Corporation, Pittsburgh, Calif. (USA) serves as comparison. It is used in the aviation industry as a cold-curing epoxy resin system and gives adhesive bonds whose heat resistance is markedly higher than those obtained with epoxy resins based on bisphenol A. The epoxy resin (component A) of EA 934 adhesive has about 33% by weight of aluminum powder filling, and the hardener (component B) comprises aliphatic amines.

The test results are listed in Table 5. It can be seen that the bonds obtained with epoxy adhesives cured according to the invention using anhydrides are superior to bonds obtained with adhesives which have been cured using a conventional amine hardener. The superiority of the epoxides whose curing has been completed using anhydrides is particularly clearly discernible from the tensile shear specimens which were stored for 40 days in water at 70° C. and then tested at elevated temperatures.

TABLE 5

Tensile shear strength of Al/Al adhesive bonds

| Epoxy resin/ hardener systems | Initial strength (MPa) Test temperatures ° C. | | | Residual strength after storage (MPa) Test temperatures ° C. | | |
|---|---|---|---|---|---|---|
| | 25 | 120 | 150 | 25 | 120 | 150 |
| Hysol EA 934 NA (parts A/B) | 23.5 | 12.9 | 9.3 | 17.5 | 8.4 | 4.4 |
| BTDA/MA/TGpAP | 17.8 | 19.6 | 17.5 | 16.6 | 18.8 | 13.1 |
| PYRO/MA/TGpAP | 19.5 | 18.4 | 16.8 | 18.4 | 16.2 | 12.8 |
| PYRO/MA/TGMDA | 20.1 | 21.1 | 19.4 | 19.0 | 20.2 | 16.6 |
| HHPA/TGpAP | 21.9 | 16.4 | 14.0 | 19.1 | 15.3 | 11.3 |
| TRI/MA/TGpAP | 21.5 | 19.0 | 17.8 | 18.9 | 17.9 | 14.8 |
| PYRO/MA/TGpAP/ Epon 828 TGpAP/828 = 50:50 mol % | 19.1 | 16.9 | 11.8 | 18.0 | 13.7 | 9.8 |
| PYRO/MA/Epoxycyclo/ TGpAP TGpAP/ Epoxycyclo = 50:50 mol % | 16.9 | 17.8 | 16.9 | 17.0 | 15.7 | 11.9 |

Example 2

High-Heat-Resistance Electrical Insulator

Insulator systems currently used or medium- and high-voltage components are based on hot-curing epoxy resins which require a time-consuming and energy-intensive process. The production time is currently about 15 hours at temperatures up to 160° C. The current long-term service temperatures of 105° C. can be achieved here only by an annealing process lasting over 10 hours at temperatures of from 140 to 160° C. Using the resin systems of the invention, is now possible for insulators subject to high mechanical and electrical load and having long service lives at long-term service temperatures >=150° C. to be produced from a manufacturing process characterized in that the production time saving achieved over the prior art is about 70%, and in that to produce the long-term heat resistance a mere fraction of the previous expenditure on energy is needed.

The insulation material used is preferably polyfunctional epoxy resins cured by two or more cyclic anhydrides and having inorganic fillers and organic additives, e.g. high-temperature thermoplastics, core-shell impact modifiers and the like. The process of the invention permits chemically induced shrinkage to be reduced, meaning that less intrinsic stress is frozen into the component. The casting systems permit the production of cast components with casting weights preferably well above 100 kg. One of the advantages of the invention is the combination of processing properties, process-related properties and resultant physical properties of the components concerned, with respect to cast-resin insulator applications in medium- and high-voltage technology.

In one preferred example, the formation of a eutectic resulting from the use of at least two different suitable and compatible anhydrides lowers the processing viscosity of the entire resin mixture, permitting very high volumes of filler. The structure of the anhydrides concerned here has a decisive effect on reactivity and processability. In another preferred embodiment here, use is made of monofunctional anhydrides, inter alia, for casting applications. The resin component used comprises polyfunctional epoxy resins and/ or mixtures of the same with conventional bisphenol A resins. The fillers used are preferably aluminum oxide, aluminum hydroxide, mica and other aluminum silicate fillers, magnesium oxide, powdered quartz, fused corundum, wollastonite and powdered chalk.

Table 8 shows a particularly preferred resin system which is used to produce an insulated electrical conductor or to produce a heat-resistant cast resin article of the present invention.

TABLE 8

Particularly preferred mixing specification of a resin system of the present invention

| Component | Name | Parts by weight |
|---|---|---|
| 1 | Araldite MY 721 | 100 |
| 2 (1st hardener) | Maleic anhydride (MA) | 48 |
| 2 (2nd hardener) | Hexahydrophthalic anhydride (HHPA) | 32 |
| 3 (filler) | Fused corundum, aluminum oxide | 270 |

Here, each of the components is preferably preheated to 60° C., and the components are mixed intimately with one another, with stirring, until the mixture produced is homogeneous. Casting preferably takes place in molds preheated to 65° C. At the preferred temperature of 65° C., the gelling phase takes about 3.5 hours. After 4 hours, the green strength achieved is sufficient for demolding. The curing phase takes about 1 hour at not more than 150° C., preferably at below 120° C. and particularly preferably at from 50 to 90° C. The glass transition temperatures achieved here are above 200° C.

Generally, depending on the selection of the components concerned, the gelling temperatures selected to achieve the green strengths are from in particular room temperature, i.e. a temperature of generally 25° C., to 90° C. The curing phase generally lasts from 1 to 3 hours at not more than 150° C., preferably at below 120° C. and particularly preferably at from 50 to 90° C. This phase is highly dependent on the weight of the cast component and also on the maximum wall thickness.

On comparing with two currently used insulation systems, notable factors are the high $T_g$ value and the short process times needed, without any significant losses in mechanical properties (Table 9).

TABLE 9

Comparison of parameters for standard casting resin formulations of the prior art with a heat-resistant formulation in a preferred example of the present invention.

| Parameter Resin base | Temperature | Prior art insulator 1 Solid resin | Prior art insulator 2 Liquid resin | Heat-resistant insulator Liquid resin |
|---|---|---|---|---|
| Tensile strength [MPa] | RT | 60–70 | 60–77 | 70.8 ± 1.8 |
| | 105° C. | 35–40 | 42–52 | 53.1 ± 2.4 |
| | 160° C. | — | — | 37.5 ± 2.1 |
| Modulus of elasticity [GPa] | RT | 6.7–7.1 | 11.8–13.6 | 10.8 ± 0.1 |
| | 105° C. | 6.0–6.2 | 9.4–10.5 | 8.8 ± 0.3 |
| | 160° C. | — | — | 5.4 ± 0.3 |
| Elongation at break [%] | RT | 1.0–1.5 | 0.5–0.75 | 0.71 ± 0.03 |
| | 105° C. | — | 9.46–0.88 | 0.71 ± 0.03 |
| | 160° C. | — | — | 0.93 ± 0.07 |
| Glass transition temperature $T_g$ | | 115° C. | 145° C. | |
| Gelling & curing phase | | 5 h @ 130° C. + 12 h @ 130° C. | 4 h @ 80° C. + 16 h @ 160° C. | 4 h @ 65° C. + 1 h @ max 150° C. |

The desired combination of a shortened processing cycle and, associated with this, very high heat resistance, and also the suitable selection of filler, allows the production of high-quality cast components at relatively short process intervals. Costs can also be saved due to lower energy costs. Appropriate conduct of the process and choice of filler permit preferably thick-walled cast components to be produced despite the relatively high reactivity of the material. Adhesion to metallic substrates, in particular aluminum, is very good.

Example 3

Coating of Heat-sensitive Substrates

There is a requirement for coatings which can be processed at low to moderate temperatures, e.g. at room temperature or not more than 150° C., and which moreover have dimensional stability and heat resistance at least to 280° C.

Heat-resistant coatings of the present invention using a resin system of the invention are particularly suitable for heat-sensitive and/or corrosion-sensitive substrates, such as metals, e.g. aluminum and aluminum alloys, ceramic materials, glass, natural substances of biological origin, and polymers. The coatings may also be used advantageously in components subjected to heat in mechanical engineering, in lightweight construction using metals, or in electronics or electrical engineering. By this means, and where appropriate, higher operating temperatures can be achieved while maintaining the high level of protection afforded to the substrates or components.

Table 10 shows the mixing specification of a particularly preferred embodiment of the coating according to the invention, which was applied to an aluminum substrate:

| Component | Parts by weight (PW) |
|---|---|
| MY721 resin | 6.25 |
| Maleic anhydride (MA) | 3 |
| Pyromellitic dianhydride (PYRO) | 2 |
| Acetone | 5.63 |
| Aerosil 200 agent with thixotropic effect | 0.34 |

After application of the coating, the system is crosslinked and cured for 24 hours at room temperature and postcured for 1 hour at a temperature of 90° C. The coating thus obtained has a thickness of 150 μm and is dimensionally stable and heat-resistant up to 300° C. The resultant coating also has a glass transition temperature of 270° C., very good adhesion to the aluminum substrate, and no defects of any kind.

In this preferred embodiment of the present invention, a solvent is used. The use of solvents, e.g. acetone, MEK, DMF, DMSO, DMAc or NMP, gives homogeneous solutions with a very high proportion of solids, generally a proportion of up to 70% of solids. It is preferable for coatings which comprise solvents to be stored at a temperature below 10° C. for 24 hours after the components have been mixed. This ensures complete dissolution of all of the components without any adverse effects on the processing properties of the coating, e.g. on solution viscosity.

The coating is applied in the manner known to the skilled worker to the surface of the heat-sensitive substrate, for example by spraying. If the coating was prepared with the use of a solvent, this evaporates during the course of curing. The example described in Table 10 also comprises an agent with thixotropic effect, and this is in particular added for use of the coating of the invention on surfaces with some or steep inclination.

Although preferred embodiments and examples of the invention have been described here, it is obvious to the worker skilled in the field of the invention that changes and modifications to the embodiments and examples described can be made without departing from the essence or purpose of the invention.

What is claimed is:

1. A resin system comprising at least two components which can be stored separately and crosslinked with one another at room temperature, wherein the first component comprises at least one compound of a formula (I)

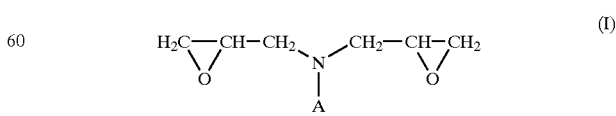

(I)

where A is an unsubstituted or substituted aromatic radical, and the second component comprises at least two different cyclic anhydrides of an organic acid, one of the at least two cyclic anhydrides having been selected from maleic anhydride (MA), benzene-1,2,4,5-tetracarboxylic dianhydride (pyromellitic dianhydride, PYRO), benzene-1,2,4-tricarboxylic anhydride (trimellitic anhydride, TRIM) and 1,4,5,6,7,7-hexachloro-5-norbornene-2,3-dicarboxylic anhydride (HET),
with a proviso that the compound of the formula (I) is not a compound of a formula (II)

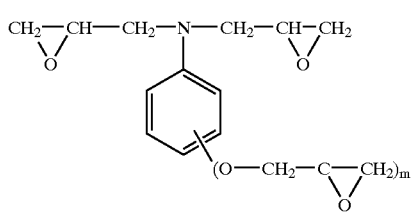

(II)

where m=1 or 2,
if the cyclic anhydride is a compound of a formula (III)

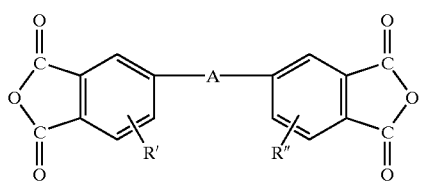

(III)

where A is a carbonyl radical, or has a formula

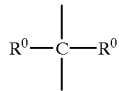

where each radical $R^o$ is a hydrogen atom or halogen atom, a hydroxyl radical or a $C_1$-$C_5$-alkyl radical or an alkoxy radical, or a $C_1$-$C_5$-alkyl-substituted oxycarbonyl radical, and R' and R", independently of one another, are hydrogen atoms or halogen atoms, $C_1$-$C_5$-alkyl groups, nitro groups, carboxyl groups, sulfonyl groups or amino groups.

2. The resin system as claimed in claim 1, wherein the at least one compound of the formula (I) has been selected from N,N,N',N'-tetraglycidyl-4,4'-diaminodiphenylmethane, N,N,N',N'-tetraglycidyl-α,α'-bis(4-aminophenyl)-p-diisopropyl-benzene, N,N,N',N'-tetraglycidyl-α,α'-bis(3,5-dimethyl-4-aminophenyl)-p-diisopropyl-benzene, N,N-diglycidylaniline and O,N,N-triglycidyl-4-aminophenol.

3. The resin system as claimed in claim 1, wherein the first component comprises at least two different compounds of the formula (I).

4. The resin system as claimed in claim 1, wherein the first component comprises O,N,N-triglycidyl-4-aminophenol and N,N,N',N'-tetraglycidyl-4,4'-diaminodiphenylmethane, and a ratio of the epoxy equivalents of O,N,N-triglycidyl-4-aminophenol and N,N,N',N'-tetraglycidyl-4,4'-diaminodiphenylmethane is within a range from 10:1 to 1:10.

5. The resin system as claimed in claim 1, wherein the first component comprises O,N,N-triglycidyl-4-aminophenol, N,N,N',N'-tetraglycidyl-4,4'-diaminodiphenylmethane and N,N-diglycidylaniline, and a percentage molar proportion of N,N-diglycidylaniline, based on a total of molar proportions of O,N,N-triglycidyl-4-aminophenol, N,N,N',N'-tetraglycidyl-4,4'-diaminodiphenylmethane and N,N-diglycidylaniline, is less than or equal to 25 mol %.

6. The resin system as claimed in claims 1, wherein the resin system is free from curing accelerators.

7. The resin system as claimed in claim 1, wherein the first component also comprises at least one epoxide selected from the group consisting of aliphatic, cycloaliphatic, aromatic and heterocyclic epoxides, or is epoxidation products of cresol novolaks and/or of phenol novolaks, or is hydantoin epoxides, polyglycidyl ethers, cycloaliphatic epoxides, glycidyl ether compounds of a polyhydric phenol based on bisphenol A, F and/or S, or is a bis(2,3-epoxypropyl) ether of 1,4-bis(hydroxymethyl)cyclohexane, a bis(2,3-epoxypropyl) ester of 4-cyclohexene-1,2-dicarboxylic acid, a bis(2,3-epoxypropyl) ester of cyclohexane-1,2-dicarboxylic acid, a 3,4-epoxycyclohexylmethyl ester of 3,4-epoxycyclohexanecarboxylic acid, or is 4-vinyl-1-cyclohexene diepoxide, a molar proportion of the at least one epoxide, based on the first component, being from 1 to 75 mol %.

8. The resin system as claimed in claim 1, wherein the resin system also comprises at least one lactone at a concentration of from 0.1 to 1.5 mol per epoxy equivalent of the first component.

9. The resin system as claimed in claim 1, wherein the resin system comprises at least one particulate and/or fibrous filler as a third component.

10. The resin system as claimed in claim 1, wherein the resin system comprises at least one additional component selected from at least one plasticizer, elasticizer, extender, and flame retardant, and at least one reinforcing fiber.

11. The resin system as claimed in claim 1, wherein the second component comprises from 1 to 99 % by weight of maleic anhydride (MA).

12. The resin system as claimed in claim 1, wherein the second component comprises at least one of the following substances: 2-sulfobenzoic acid cycloanhydride (SBA), 3,3',4,4'-benzophenonetetracarboxylic dianhydride (BTDA), 3,3',4,4'-biphenyltetracarboxylic dianhydride (s-BPDA), hexafluoropropylidene-2,2'-bis(phthalic anhydride) (6FDA), 4,4'-oxybis(phthalic anhydride) (OPDA), 3,3',4,4'-diphenyl sulfone tetracarboxylic dianhydride (DSDA), 5-(2,5-dioxotetrahydrol)-3-methyl-3-cyclohexane- 1,2-dicarboxylic anhydride, naphthalene-1,4,5,8-tetracarboxylic dianhydride (NTCDA), cis-cyclohexane-1,2-dicarboxylic anhydride (HHPA), 4-methylcylohexane-1,2-dicarboxylic anhydride (MCHA), 3α, 4,7,7α-tetrahydro-4,5-dimethyl-7-(2-methyl-2-propenyl)-1,3-isobenzofurandione, hexahydro-4-methyl-7-(1 -methylethyl)-4,7-ethnoisobenzofuran- 1,3-diones and halogenated aromatic cyclic anhydrides.

13. The resin system as claimed in claim 1, wherein a ratio of the epoxy equivalent of the first component to the anhydride equivalent of the second component is within a range from 1:0.2 to 1:1.2.

14. A process for producing an insulated electrical conductor whose insulation comprises a crosslinked epoxy resin, wherein to prepare the crosslinked epoxy resin, a resin system is used which comprises at least two components which can be stored separately and crosslinked with one another at room temperature, where the first component comprises at least one compound of a formula (I)

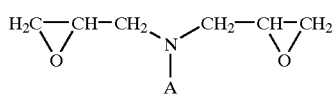

(I)

where A is an unsubstituted or substituted aromatic radical,
and the second component comprises at least two different cyclic anhydrides of an organic acid, where one of the at least two cyclic anhydrides has been selected from maleic anhydride (MA), benzene-1,2,4,5-tetracarboxylic dianhydride (pyromellitic dianhydride, PYRO), benzene-1,2,4-tricarboxylic anhydride (trimellitic anhydride, TRIM) and 1,4,5,6,7,7-hexachloro-5-norbornene-2,3-dicarboxylic anhydride (HET),
with a proviso that the compound of the formula (I) is not a compound of a formula (II)

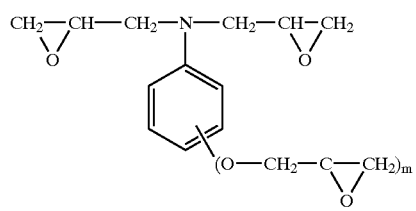

(II)

where m=1 or 2,
if the cyclic anhydride is a compound of a formula (III)

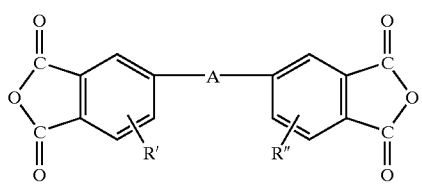

(III)

where A is a carbonyl radical, or has a formula

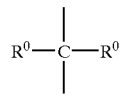

where each radical $R^o$ is a hydrogen atom or halogen atom, a hydroxyl radical or a $C_1$-$C_5$-alkyl radical or an alkoxy radical, or a $C_1$-$C_5$-alkyl-substituted oxycarbonyl radical, and R' and R", independently of one another, are hydrogen atoms or halogen atoms, $C_1$-$C_5$-alkyl groups, nitro groups, carboxyl groups, sulfonyl groups or amino groups.

15. The process as claimed in claim 14, wherein the resin system crosslinks in less than 24 hours at room temperature.

16. The process as claimed in claim 14, wherein any possible postcuring takes place in less than 3 hours at a temperature below 120° C.

17. An insulated electrical conductor produced by the process as claimed in claim 14.

18. A cast resin article with a resin system as claimed in claim 1.

19. The cast resin article as claimed in claim 18, wherein the cast resin article has a casting weight of from 5 to 500 kg.

20. The cast resin article as claimed in claim 18, wherein the cast resin article has at least one active element, the at least one active element being selected from the group consisting of metallic materials and conductive plastics and compounds.

21. A coating with a resin system as claimed in claim 1.

22. The coating as claimed in claim 3, wherein the first component comprises three different compounds of the formula (I).

23. The coating as claimed in claim 7, wherein the at least one epoxide is an epoxide built up from polyhydric phenols.

24. The coating as claimed in claim 7, wherein the molar proportion of the at least one epoxide, based on the first component, is from 10 to 50 mol %.

25. The resin system as claimed in claim 11, wherein the second component comprises more than 50 % by weight of maleic anhydride (MA).

26. The resin system as claimed in claim 25, wherein the second component comprises more than 60 % by weight of maleic anhydride (MA).

27. The process as claimed in claim 14, wherein the at least two components can be crosslinked with one another without using a curing accelerator.

28. The process as claimed in claim 16, wherein postcuring takes place in between 1 hour and 3 hours.

29. The process as claimed in claim 16, wherein postcuring takes place at a temperature from 50 to 100° C.

30. The process as claimed in claim 29, wherein postcuring takes place at a temperature from 50 to 90° C.

31. The cast resin article as claimed in claim 18, wherein the article is an electrical insulator.

32. The cast resin article as claimed in claim 19, wherein the casting weight is from 50 to 500 kg.

33. The cast resin article as claimed in claim 32, wherein the casting weight is from 100 to 500 kg.

34. The coating as claimed in claim 21, wherein the coating is for a heat-sensitive substrate.

* * * * *